United States Patent [19]

Blaustein et al.

[11] 4,405,331
[45] Sep. 20, 1983

[54] REFUSE DERIVED FUEL AND A PROCESS FOR THE PRODUCTION THEREOF

[75] Inventors: Eric W. Blaustein; Edward J. Patton, both of Pittsburgh, Pa.

[73] Assignee: Acres American Incorporated, Pittsburgh, Pa.

[21] Appl. No.: 371,218

[22] Filed: Apr. 23, 1982

[51] Int. Cl.³ .......................... C10L 5/48; C10L 5/14
[52] U.S. Cl. ..................... 44/1 D; 44/15 C; 44/16 R
[58] Field of Search ............... 44/15 C, 15 D, 15 R, 44/4, 10 R, 1 D, 16 A, 26, 16 R

[56] References Cited

U.S. PATENT DOCUMENTS

| 3,240,573 | 3/1966 | Eyre, Jr. | 44/15 R |
| 3,377,146 | 4/1968 | Stroh | 44/10 R |
| 3,635,684 | 1/1972 | Seymour | 44/10 R |
| 4,026,678 | 5/1977 | Livingston | 44/1 D |
| 4,078,902 | 3/1978 | Olson | 44/16 A |
| 4,326,854 | 4/1982 | Tanner | 44/15 B |
| 4,356,000 | 10/1982 | Chappell | 44/1 D |

Primary Examiner—Delbert E. Gantz
Assistant Examiner—Anthony McFarlane
Attorney, Agent, or Firm—Reed, Smith, Shaw & McClay

[57] ABSTRACT

The subject invention pertains to a novel refuse derived fuel comprising a mixture of solid refuse, fly ash and a binder and to a process for its production. In a further embodiment of the invention, the novel refuse derived fuel includes coal fines as an additional component.

23 Claims, 1 Drawing Figure

SIMPLIFIED PROCESS FLOW SHEET

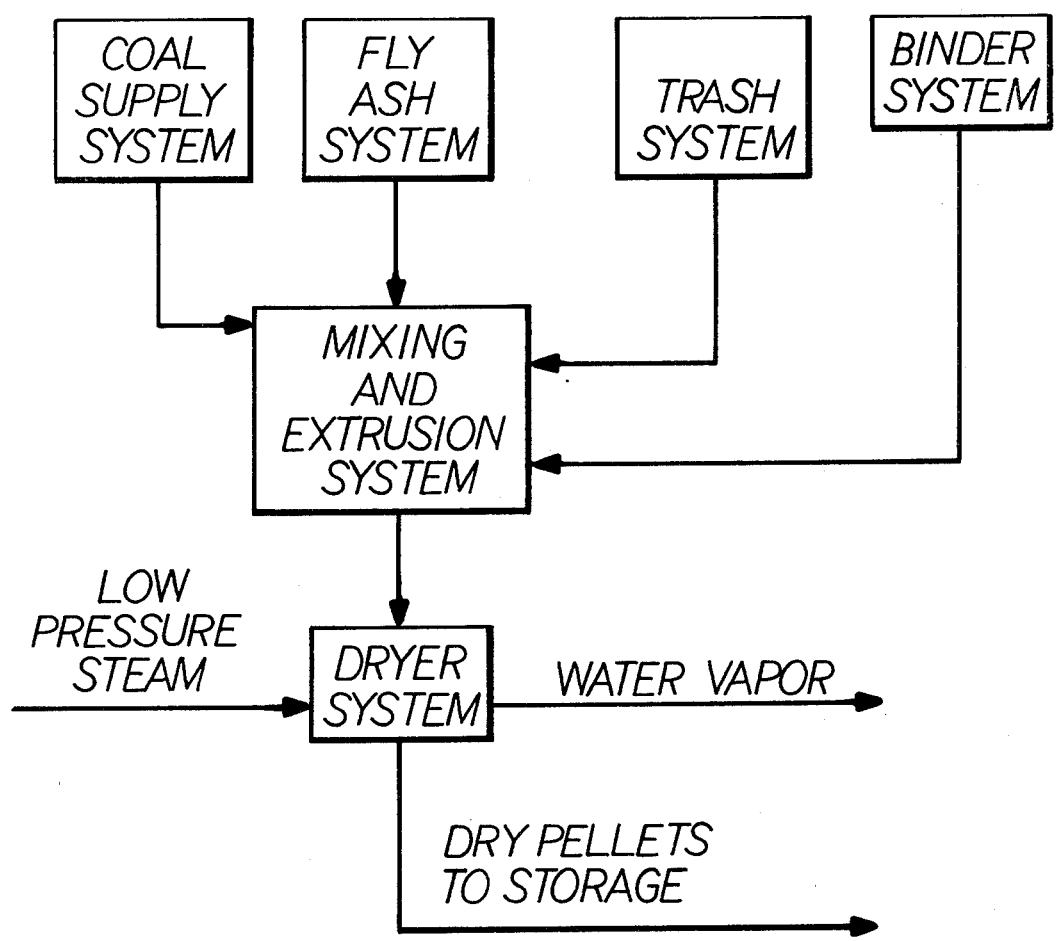
FIGURE I
SIMPLIFIED PROCESS FLOW SHEET

REFUSE DERIVED FUEL AND A PROCESS FOR THE PRODUCTION THEREOF

FIELD OF THE INVENTION

The subject invention pertains to fuel in general and to a refuse derived fuel specifically.

BACKGROUND OF THE INVENTION

Due to ever increasing economic costs and shortages of fossil fuel sources, it has become desirable to develop alternative fuel sources. Commitment to energy and environmental conservation has also contributed to the drive to develop alternative fuel sources. Contemporaneously with this trend toward the development of alternative fuel sources, environmental and legal concerns and regulatory agencies have escalated the costs related to the disposal of industrial refuse and other wastes. Such escalation in cost has resulted in the development of alternative methods of refuse and waste disposal.

In response to these concerns, technical interest in the fuel value of urban solid refuse developed in Europe in the 1950's and spread to the United States in the late 1960's. Much of the work on refuse derived fuel to date has concentrated on urban solid refuse due to its enormous volume. The literature reports test in which pellets were produced by extrusion of urban solid refuse through a die using bench scale and commercial equipment and reports a relationship between power consumption and other process variables. Prezek, G. J., "Fundamental Considerations In Preparing Densified Refuse Derived Fuel", U.S. EPA, EPA/600/2-81-180, September, 1981. The literature further describes a test burn of 285 tons of urban solid refuse derived pellets mixed with coal in a spreader stoker fired boiler conducted at the Maryland State Correctional Institute in 1976 and 1977, and reports that coal:refuse derived fuel blends up to volumetric ratios of 1:2 can be burned without major equipment modifications. Dengler, G. H, Rigo, H and Riler, Jr., D. "A Field Test Using Coal: dRDF Blends in Spreader Stoker Fired Boilers", U.S. EPA, EPA 600-2/80-095, August 1980. The literature also reports a 1700 ton test burn of urban solid refuse derived pellets in an industrial spreader stoker boiler conducted in 1979 in which extensive data was collected on all aspects of the combustion process. Klinbens, N., "Coal: dRDF Demonstration Test On An Industrial Spreader Stoker Boiler", U.S. EPA, EPA-600/2-81-83, Volume 1, EPA-600/2 81-84, Volume 2.

Fly ash, a byproduct of coal combustion, is a solid refuse material generated by many boilers and other heat and power generating facilities in operation today. Typically, the fly ash is disposed in landfills, but due to both the escalation in the costs related to the transportation of fly ash to a landfill and the limited number of new landfills being approved by governmental and regulatory agencies, an alternative disposal method for fly ash has become desirable.

Until the advent of the present invention, it was not thought to be possible to successfully incorporate fly ash into a refuse derived fuel due to the inherent physical characteristics of fly ash. Supportive of this belief is the recognition that none of the refuse derived fuels reported in the above literature mentioned or suggested the possible incorporation of fly ash. It has now surprisingly and unexpectedly been found that a refuse derived fuel containing fly ash can be successfully produced and that such a refuse derived fuel exhibits not only good physical properties but also good heating values.

SUMMARY OF THE INVENTION

The subject invention pertains to a novel refuse derived fuel comprising a mixture of refuse, fly ash and a binder and to a process for its production. In a further embodiment of the invention, the refuse derived fuel includes coal fines as an additional component.

BRIEF DESCRIPTION OF THE DRAWING

FIG. 1 is a simplified process flow sheet of a process embodiment in accordance with the present invention.

DETAILED DESCRIPTION OF THE INVENTION

The present invention is directed to a novel refuse derived fuel comprising a mixture of solid refuse, fly ash, and a binder and to a process for its production, and to a preferred embodiment of the refuse derived fuel in which coal fines are present as an additional component.

Solid refuse suitable in the invention encompasses virtually any solid refuse or trash encountered in either an industrial or municipal environment. As used herein, the solid refuse may contain minor amounts of fly ash. Preferably, the solid refuse is what is known as "clean trash" in that it consists substantially of solid, cellulose-based materials, such as paper, kraft paper, cardboard, computer print-outs and cards, and paper towels, plastic-based, such as styrofoam and other soft plastics, metallic-based materials, such as acco-type fasteners, ring binders, paper clips, staples, binder clips and other sundry type soft metal wastes and glass. More preferably, the refuse or clean trash is substantially cellulose-based material and is substantially free of glass and metallic materials. Further, the refuse used in the invention preferably is in a shredded or comminuted form and is 3/16 inch×0 in size.

Fly ash suitable in the invention includes virtually all types and grades of fly ash in existence today. As is well known in the art, fly ash is the very fine ash produced by combustion of coal with a forced draft and is often carried off with flue gas which is passed through a separating means, such as a bag house, to collect the fly ash prior to release of the flue gas to the atmosphere. Preferably, the fly ash will have a density of about 35 pounds per cubic foot, a particle size of 70% minus 200 mesh, and a heating value of from about 3,000 to 5,000 BTUs per pound.

The binder suitable in the invention comprises any dry or liquid chemical compound or material which will furnish the adhesive properties necessary to maintain the components of the refuse derived fuel in combustion with each other. Preferably, the binder will contribute to the wet compressive strength of the fuel, the dry compressive strength of the fuel, the heating value of the fuel, be consumed with the fuel and have a low sulfur and ash content. Suitable binders include corn starch, portland cement, asphalt emulsion and lignin. Preferred binders are corn starch and lignin.

Coal fines suitable in the invention preferably comprise coal which has been reduced to a size of less than 28 mesh. Although the coal fines are not required in the present invention, they may be incorporated in the fuel to increase the overall heating value of the fuel.

The refuse derived fuel is preferably in an extruded pellet form in the shape of a small cylinder ⅝ inch in diameter by ⅝ inch long, has a wet compressive strength of at least about 9 psi, has a dry compressive strength of at least about 30 psi, has a moisture content in its wet form of less than about 18%, and has a moisture content in its dry form of less than about 10% by weight. Preferably, the fuel exhibits at a minimum moderate moisture resistance. Additionally, the refuse derived fuel of the invention has a heating value in excess of about 6,000 BTUs per pound which permits its use as a primary or supplemental fuel source depending on the heating value desired.

Although the refuse, fly ash, binder and optional coal fines may be present in the refuse derived fuel in any desired amounts, it is preferred that in the absence of coal fines, the refuse be present in from about 5 to 60% by weight, more preferably in about 5 to 30% by weight, the fly ash be present in from about 40 to 95% by weight, more preferably in about 80 to 95% by weight, and the binder be present in from about 1 to 15% by weight, more preferably in from about 2 to 10% by weight. Additionally, in the preferred embodiment of the invention in which coal fines are present as a component of the fuel, the refuse may be present in from about 5 to 30% by weight, more preferably in from about 15 to 20% by weight, the fly ash may be present in from about 40 to 70% by weight, more preferably in from about 55 to 60% by weight, the coal fines may be present in from about 10 to 40% by weight, more preferably in about 15 to 20% by weight, and the binder may be present in from about 1 to 15% by weight, more preferably from about 2 to 10% by weight.

The refuse derived fuel may be formed by a suitable mixing process in which the fuel components are brought into combination to form a unified fuel. Preferably, the fuel is formed by extrusion or compression means using extrusion or compression equipment commonly available and described in the art.

A preferred process for preparing the refuse derived fuel of the invention is set forth in the simplified process flow sheet shown in the drawing and comprises a coal fines system, a fly ash system, a clean trash system, a mixing and extrusion system, a dryer system and a binder system.

The coal fines system may consist of a coal fines hopper and associated downstream equipment. Coal fines from the hopper are removed by a variable rate feed dervice and conveyed to the mixing and extrusion system.

The fly ash system may consist of a fly ash hopper and associated downstream equipment. Fly ash from the hopper is removed by a variable rate feed device and conveyed to the mixing and extrusion system.

The clean trash unit may consist of one or more clean trash hoppers and one or more waste reduction units and associated downstream equipment. Clean trash is removed from the hopper by an adjustable rate feeding device and conveyed to a waste reduction unit where substantially all of the metallic trash is removed from the clean trash by a magnetic separator, and the clean trash is reduced to a 3/16 inch×0 size by a hammer mill. The reduced clean trash is then conveyed to the mixing and extrusion unit. The metallic trash may be removed at one or more points in the system, and the clean trash may be reduced to the desired size using one or more hammer mills. The specifics of the clean trash system will be dictated by the characteristics of the clean trash used and the desired size of the reduced clean trash conveyed to the mixing and extrusion unit.

The binder system may consist of a binder storage tank and an adjustable rate metering pump. The binder is received in a dry state and mixed with water to form a 15% by weight binder solution which is stored in the binder storage tank. The resulting binder solution is then fed into the mixing and extrusion system by the adjustable rate metering pump.

The mixing and extrusion system may consist of a variable speed, continuous mix muller, an extruder and associated conveyor equipment. The coal fines from the coal fines system, the fly ash from the fly ash system, the reduced clean trash from the clean trash system and the binder solution from the binder system enter the variable speed continuous mix muller at a rate determined to yield a refuse derived fuel having the desired composition. Fly ash from a dryer located downstream of the mix muller may be recycled to the mix muller on an occasional basis. In the mix muller, all of these components are thoroughly mixed to produce a uniform wet mixture suitable for extrusion. This mixture is then transferred from the mix muller to the extruder. The rate of discharge from the mix muller may be controlled by automatic gates to maintain a constant inventory in the mix muller. In the extruder, additional mixing takes place in the plug mill section. An auger then presses the mixture through a die to produce uniform ⅝" in diameter by ⅝" long pellets. Water may be added, if desired, to the extruder press to improve its efficiency and performance. The extruder should be sized to operate at a constant rate of rotation and to process the material at the rate it is received.

The pellets formed by the extruder may then be transported to a dryer system. The dryer system may consist of a hot air dryer and associated solid conveying and air-handling equipment. Green (wet) pellets from the extruder are conveyed by conveyor means to and through the dryer to yield a pellet containing no more than about 10% by weight moisture. The hot air for the dryer is produced by ambient air which is drawn from the atmosphere and is blown across a heat exchanger heated by low pressure steam. The resulting hot air is blown through the dryer to dry the pellets and is vented from the dryer to the atmosphere. Air temperature is sensed within the dryer, and the steam pressure in the heat exchanger is adjusted automatically to maintain a constant air temperature.

The dried pellets are then transported from the exit of the dryer to a storage facility until they are to be used as a fuel source.

The invention will be further illustrated, but is not intended to be limited, by the following examples. Unless indicated to the contrary, all percentages in the Examples are percentages by weight.

EXAMPLES

The extruder used consisted of a ceramic extrusion machine designed for laboratory application. The unit was equipped with a 5 HP motor and a 4 inch diameter single flight auger with a flight spacing of 2½ inches. The unit was also equipped with a rotary piston vacuum pump so that extrusion may be performed under vacuum. The die consisted of a steel plate 1 inch thick with circular holes 5/8 inch in diameter. An extension ring 2 inches long was used behind the die to provide densification of the mixture. The pressure drop through the 1 in. steel die, as measured, was approximately 2,000 lbs.

All moisture determinations were made using a solid state Moistu-Trac analyzer. The drying temperature was set to 150° C. Samples were dried (prior to dry compression test) in an electrically heated convection oven at 250° F. with forced air circulation and an outlet to discharge moist air.

Mixing of solid and liquid ingredients is done in an intensive mixer equipped with a mixing propeller. The mixing time and speed is kept constant (1 min. at 500 RPM for a total batch of 25 lbs.)

The compressive strength of samples is measured using a power activated hydraulic press at constant strain rates. Total stress levels (with increments of 1 lb.) are noted through a digital read out.

The impact strength of green (wet) extruded pellets is determined by individually dropping each pellet from a height of 18 inches onto a ½ inch thick steel plate. The number of drops before failure is noted for each pellet. The average number of drops for each group of 10 pellets is then calculated.

EXAMPLE 1

Refuse derived fuel pellets ⅜″ in diameter by 1″ long formed from a charge consisting of 20% coal fines, 20% shredded paper trash, 57% fly ash and 3% corn starch were produced with the equipment. The moisture content of the green (wet) pellets prior to drying was 30%. The properties of the resulting pellets are presented in Table 1.

EXAMPLE 2

Refuse derived fuel pellets ⅜″ in diameter by 1″ long formed from a charge consisting of 20% coal fines, 20% shredded paper trash, 56% fly ash and 5% corn starch were produced with the above equipment. The moisture content of the green (wet) pellets prior to the resulting pellets to drying was about 30%. The properties are presented in Table 1.

EXAMPLE 3

Refuse derived fuel pellets ⅜″ in diameter by 1″ long formed from a charge cosisting of 20% coal fines, 20% shredded paper trash, 55% fly ash and 5% corn starch were produced with the above equipment. The moisture content of the green (wet) pellets prior to drying was about 30%. The properties of the resulting pellets are presented in Table 1.

TABLE 1

| EXAMPLE NO. | BINDER CONTENT (CORN STARCH) | GREEN STRENGTH DROP NUMBERS | COMPRESSION STRENGTH AT 10 PERCENT MOISTURE | EXTRUSION MOISTURE |
|---|---|---|---|---|
| 1 | 3% | 3.0 | 46 psi | 30% |
| 2 | 4% | 11.9 | 60 psi | 30% |
| 3 | 5% | 14.2 | 72 psi | 30% |

EXAMPLES 4-30

Refuse derived pellets ⅜″ in diameter by 1″ long formed from charges consisting of varying percentages of coal fines, shredded paper trash, fly ash and either a corn starch, lignin or asphalt emulsion binder were produced with the equipment. Moisture content of the green (wet) pellets prior to drying varied between about 28 and 33%. The properties of the resulting pellets are present in Table 2.

EXAMPLE 31

Refuse derived pellets ⅜″ in diameter by 1″ long formed from a charge consisting of 19.4% coal fines, 19.4% shredded paper trash, 58.2% fly ash and 3% lignin were produced with the equipment. A time study of the drying characteristics of the pellets is presented in Table 3.

TABLE 2

| Example No. | % Binder | Binder Name | % Fly Ash | % Shredded Waste Material | % Coal Fines | Green Compression Test (psi) | Dry Compression Test (psi) | Moisture Content (Dry Comp.) | Green Strength Drop Numbers | Vacuum In Inches |
|---|---|---|---|---|---|---|---|---|---|---|
| 4 | 4 | ST | 86 | 10 | — | — | — | — | — | — |
| 5 | 4 | ST | 76 | 20 | — | — | 143.6 | 4.5 | — | — |
| 6 | 4 | ST | 66 | 30 | — | — | — | — | — | — |
| 7 | 4 | ST | 57.6 | 19.2 | 19.2 | — | 36.7 | 10.7 | 11.9 | — |
| 8 | 5 | LIG(D) | 57.0 | 19.0 | 19.0 | — | 99.6 | 4.5 | 6.35 | — |
| 9 | 4 | LIG(D) | 57.6 | 19.2 | 19.2 | — | 81.4 | 4.5 | 5.10 | — |
| 10 | 3 | LIG(D) | 58.2 | 19.4 | 19.4 | — | — | — | 3.25 | — |
| 11 | 10 | LIG(D) | 54 | 18.0 | 18.0 | — | 91.0 | 4.5 | 5.10 | — |
| 12 | 6.31 | LIG(L) | 56.2 | 18.74 | 18.74 | — | — | — | 3.55 | — |
| 13 | 5 | LIG(L) | 57 | 19.0 | 19.0 | — | — | — | 4.8 | — |
| 14 | 4 | LIG(D) | 57.6 | 19.2 | 19.2 | 11.4 | 87.8 | 2.09 | 9.25 | — |
| 15 | 5 | LIG(D) | 57.0 | 19.0 | 19.0 | 9.3 | 57.9 | 1.12 | 5.4 | — |
| 16 | 6 | LIG(D) | 56.4 | 18.8 | 18.8 | 7.9 | 53.0 | 4.4 | 4.0 | — |
| 17 | 6 | ASPH | 56.4 | 18.8 | 18.8 | 9.9 | 33.0 | 5.12 | 2.05 | — |
| 18 | 4 | LIG(D) | 57.6 | 19.2 | 19.2 | 16.1 | 90.5 | 5.61 | 6.85 | — |
| 19 | 3 | LIG(L) | 58.2 | 19.4 | 19.4 | — | — | — | 4.3 | — |
| 20 | 3 | LIG(L) | 58.2 | 19.4 | 19.4 | 23.9 | 129.5 | 4.5 | 5.95 | — |
| 21 | 2 | LIG(L) | 58.8 | 19.6 | 19.6 | 7.7 | 29.0 | 4.5 | 2.8 | — |
| 22 | 2 | LIG(L) | 58.8 | 19.6 | 19.6 | 15.6 | 90.2 | 4.5 | 6.4 | — |
| 23 | 4 | LIG(L) | 57.6 | 19.2 | 19.2 | — | 29.6 | 11.6 | 3.3 | — |
| 24 | 4 | LIG(L) | 57.6 | 19.2 | 19.2 | 11.3 | 44.8 | 11.5 | 5.45 | — |
| 25 | 3 | LIG(L) | 58.2 | 19.4 | 19.4 | 9.3 | 103.7 | 4.21 | 2.55 | — |
| 26 | 3 | LIG(L) | 58.2 | 19.4 | 19.4 | 9.8 | 96.5 | 4.06 | 4.9 | 6 |

TABLE 2-continued

| Example No. | % Binder | Binder Name | % Fly Ash | % Shredded Waste Material | % Coal Fines | Green Compression Test (psi) | Dry Compression Test (psi) | Moisture Content (Dry Comp.) | Green Strength Drop Numbers | Vacuum In Inches |
|---|---|---|---|---|---|---|---|---|---|---|
| 27 | 2 | LIG(L) | 58.8 | 19.6 | 19.6 | 9.9 | 80.0 | 2.4 | 3.7 | — |
| 28 | 2 | LIG(L) | 58.8 | 19.6 | 19.6 | 12.7 | 55.4 | 9.00 | 4.95 | — |
| 29 | 2 | LIG(L) | 58.8 | 19.6 | 19.6 | 13.10 | 107.9 | 5.00 | 5.55 | 6 |
| 30 | 3 | LIG(L) | 58.2 | 19.4 | 19.4 | 14.0 | 94.7 | 8.9 | 4.95 | 13 |

ST = starch
LIG = lignin (commercial sodium lignosulfonate)
ASPH = asphalt emulsion
(L) = liquid
(D) = dry

TABLE 3

DRYING DATA FOR 3% LIGNIN PELLETS AT 250° F.*

| TIME (min.) | MOISTURE |
|---|---|
| 0 | 26.7 |
| 2 | 24.3 |
| 4 | 24.0 |
| 6 | 21.8 |
| 8 | 21.3 |
| 10 | 21.0 |
| 12 | 19.2 |
| 14 | 18.9 |
| 16 | 18.0 |
| 18 | 15.4 |
| 20 | 15.1 |
| 22 | 11.6 |
| 24 | 11.5 |
| 26 | 11.5 |
| 28 | 11.5 |
| 30 | 9.43 |
| 32 | 8.84 |
| 34 | 6.75 |
| 36 | 6.00 |
| 38 | 7.43 |
| 40 | 6.09 |
| 42 | 4.18 |
| 46 | 3.34 |

*Drying is with forced air (N = 10 ft per sec.)

EXAMPLE 32

A short, proximate analysis was conducted on refuse derived pellets ⅜" in diameter by 1" long formed from a charge consisting of 19.4% coal fines, 19.4% shredded paper trash, 58.2% fly ash and 3% lignin. The results of the analysis are presented in Table 4.

TABLE 4

SHORT PROXIMATE ANALYSIS

| | AS RECEIVED | DRY BASIS |
|---|---|---|
| % Moisture | 4.66 | — |
| % Ash | 47.20 | 49.51 |
| Btu/lb. | 5749 | 6030 |
| % Sulfur | 1.11 | 1.16 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A refuse derived fuel comprising an intimate mixture of:
   (a) from about 5 to 60% by weight of solid refuse which is substantially cellulose-base material substantially free of glass and metallic materials;
   (b) from about 40 to 95% by weight fly ash; and
   (c) from about 1 to 15% by weight binder.
2. The fuel of claim 1 wherein:
   (a) the solid refuse is present in from about 5 to 30% by weight,
   (b) the fly ash is present in from about 70 to 85% by weight, and
   (c) the binder is present in from about 2 to 10% by weight.
3. The fuel of claim 1 wherein the binder is selected from the group consisting of corn starch, portland cement, asphalt emulsion and lignin.
4. The fuel of claim 3 wherein the binder is selected from the group consisting of corn starch and lignin.
5. A refuse derived fuel comprising an intimate mixture of:
   (a) from about 5 to 30% by weight of solid refuse which is substantially cellulose-base material substantially free of glass and metallic materials;
   (b) from about 40 to 70% by weight fly ash;
   (c) from about 10 to 40% by weight coal fines; and
   (d) from about 1 to 15% by weight binder.
6. The fuel of claim 5 wherein:
   (a) the solid refuse is present in from about 15 to 25% by weight,
   (b) the fly ash is present in from about 50 to 60% by weight,
   (c) the coal fines are present in from about 15 to 30% by weight, and
   (d) the binder is present in from about 2 to 10% by weight.
7. The fuel of claim 5 wherein the binder is selected from the group consisting of corn starch, portland cement, asphalt emulsion and lignin.
8. The fuel of claim 5 wherein the binder is selected from the group consisting of corn starch and lignin.
9. The fuel of claim 1 wherein the fuel is an extruded pellet.
10. The fuel of claim 9 wherein the extruded pellet is dry and has a moisture of content of less than about 10% by weight and a compressive strength of at least about 30 psi.
11. The fuel of claim 9 wherein the extruded pellet is green (wet) and has a moisture content of less than about 18% by weight and a compressive strength of at least about 9 psi.
12. A process for the production of a refuse derived fuel comprising intimately mixing:
   (a) from about 5 to 60% by weight of solid refuse which is substantially cellulose-base material substantially free of glass and metallic materials;
   (b) from about 40 to 95% by weight fly ash; and
   (c) from about 1 to 15% by weight binder.
13. The process of claim 12 wherein:

(a) the solid refuse is present in from about 5 to 30% by weight,
(b) the fly ash is present in from about 70 to 85% by weight, and
(c) the binder is present in from about 2 to 10% by weight.

14. The process of claim 12 wherein the intimate mixing is accomplished by extrusion means.

15. The process of claim 12 wherein the fuel is produced in pellet form.

16. The process of claim 12 wherein the binder is selected from the group consisting of corn starch, portland cement, asphalt emulsion and lignin.

17. The process of claim 16 wherein the binder is selected from the group consisting of corn starch and lignin.

18. A process for the production of a refuse derived fuel comprising intimately mixing:
(a) from about 5 to 30% by weight solid refuse which is substantially cellulose-base material substantially free of glass and metallic materials;
(b) from about 40 to 70% by weight fly ash;
(c) from about 10 to 40% by weight coal fines; and
(d) from about 1 to 15% by weight binder.

19. The process of claim 18 wherein:
(a) the solid refuse is present in from about 15 to 25% by weight,
(b) the fly ash is present in from about 50 to 60% by weight,
(c) the coal fines are present in from about 15 to 30% by weight, and
(d) the binder is present in from about 2 to 10% by weight.

20. The process of claim 18 wherein the intimate mixing is accomplished by extrusion means.

21. The process of claim 20 wherein the fuel is produced in pellet form.

22. The process of claim 18 wherein the solid refuse is clean trash.

23. The process of claim 12 wherein the solid refuse is clean trash.

* * * * *